US012600617B2

(12) United States Patent
Vogelaar

(10) Patent No.: US 12,600,617 B2
(45) Date of Patent: Apr. 14, 2026

(54) FUEL DISPENSER ADAPTOR FOR AUTOMATIC REFUELLING

(71) Applicant: Autofuel ApS, Grindsted (DK)

(72) Inventor: Johannes Sijbrand Vogelaar, Niederzier (DE)

(73) Assignee: Autofuel ApS, Grindsted (DK)

(*) Notice: Subject to any disclaimer, the term of this patent is extended or adjusted under 35 U.S.C. 154(b) by 383 days.

(21) Appl. No.: 18/552,015

(22) PCT Filed: Mar. 29, 2022

(86) PCT No.: PCT/EP2022/058315
§ 371 (c)(1),
(2) Date: Sep. 22, 2023

(87) PCT Pub. No.: WO2022/207662
PCT Pub. Date: Oct. 6, 2022

(65) Prior Publication Data

US 2024/0294370 A1 Sep. 5, 2024

(30) Foreign Application Priority Data

Mar. 30, 2021 (EP) .................................... 21165925

(51) Int. Cl.
*B67D 7/04* (2010.01)

(52) U.S. Cl.
CPC .... *B67D 7/0401* (2013.01); *B67D 2007/0417* (2013.01); *B67D 2007/0455* (2013.01)

(58) Field of Classification Search
CPC ..... B64G 1/4024; B25J 15/08; B25J 15/0608; B67D 7/0401; B67D 2007/0417
See application file for complete search history.

(56) References Cited

U.S. PATENT DOCUMENTS

| | | | | |
|---|---|---|---|---|
| 2,702,683 | A | 2/1955 | Green et al. | |
| 6,237,647 | B1 | 5/2001 | Pong et al. | |
| 8,393,362 | B1 * | 3/2013 | Hollerback | B25J 11/00 414/730 |
| 9,604,838 | B2 * | 3/2017 | Cornett | B67D 7/04 |
| 2003/0164200 | A1 | 9/2003 | Czeranna et al. | |
| 2007/0113921 | A1 | 5/2007 | Capizzo | |
| 2018/0036889 | A1 | 2/2018 | Birkmeyer | |
| 2020/0406470 | A1 | 12/2020 | Herold et al. | |

FOREIGN PATENT DOCUMENTS

| | | | |
|---|---|---|---|
| CN | 108751107 | A | 11/2018 |
| CN | 110182746 | A | 8/2019 |
| CN | 110625426 | A | 12/2019 |
| CN | 111573608 | A | 8/2020 |
| CN | 112549039 | A | 3/2021 |
| KR | 20180040325 | A | 4/2018 |

OTHER PUBLICATIONS

International Search Report and Written Opinion issued by the European Patent Office acting as International Searching Authority for International Patent Application No. PCT/EP2022/058315 dated Jul. 26, 2022 (15 total pages).

* cited by examiner

*Primary Examiner* — Timothy P. Kelly
(74) *Attorney, Agent, or Firm* — Dinsmore & Shohl LLP

(57) ABSTRACT

A fuel dispenser adaptor kit includes an adaptor tool and a ferromagnetic unit configured for being part of or attached to a fuel dispenser. The adaptor tool has a magnet configured for magnetically engaging with the ferromagnetic unit, and an activator configured for activating a lever of the fuel dispenser.

32 Claims, 6 Drawing Sheets

FUEL DISPENSER ADAPTOR FOR AUTOMATIC REFUELLING

CROSS REFERENCES TO RELATED APPLICATIONS

This application is a national-stage application under 35 U.S.C. § 371 of International Application No. PCT/EP2022/058315, filed Mar. 29, 2022, which claims benefit of priority to European Patent Application No. 21165925.5, filed Mar. 30, 2021 the entireties of both which are hereby incorporated herein.

FIELD OF INVENTION

The present disclosure relates to a fuel dispenser adaptor kit and a robotic refuelling system comprising a fuel dispenser adaptor kit for automatically operating a fuel station for refuelling vehicles.

BACKGROUND

An automated robot-guided refuelling poses potential threats when using powerful robots. Therefore, robots are generally equipped with an external security system for increasing the safety of an operation. A variety of existing robotic charging stations across various industries have been secured by a variety of safety technologies, such as monitoring of the working area of the robot with cameras or other sensors. Industrial robotic systems are commonly secured in a designated cell. However, the challenge is to fulfil safety requirements such that the automatic refuelling can take place in close proximity of humans and explosives.

Several safety requirements apply also to the apparatus or the tool, which supplies fuel to the vehicle's fuel inlet. Electrical safety switches and sensors in the area around a fuel dispenser should support such an apparatus. Furthermore, to avoid spark formation in the vicinity of the fuel, it is advantageous to minimize the electronics of such an apparatus while fulfilling the required safety measures.

A further challenge is to provide an apparatus for automated refuelling of vehicles that is relatively simple and inexpensive. An essential requirement in a fuel station is that the filling process proceeds as quickly as possible to reduce waiting time. Additionally, the refuelling tool or apparatus should work efficiently while avoiding fuel spillage and excess energy consumption because of over-fueling.

SUMMARY

The present disclosure concerns a fuel dispenser adaptor kit for a robotic refuelling system. The disclosed kit can be implemented in a robotic refuelling system so that the operation of refuelling of vehicles can be automated. This implies that with the present disclosure, the driver is relieved from the refuelling task and given more freedom.

Furthermore, the disclosed fuel dispenser adaptor kit is suitable for fulfilling the strict safety requirements such that the disclosed kit can operate in a fuel station in close proximity to humans and explosives.

In general, the present disclosure therefore relates to a fuel dispenser adaptor kit, which can be implemented to an automatic refuelling system for automatically refuelling vehicles, primarily but not limited to cars.

Thus, in a first aspect, the present disclosure relates to a fuel dispenser adaptor kit comprising an adaptor tool and a ferromagnetic unit configured for being part of or attached to a fuel dispenser, wherein the adaptor tool comprises a magnet configured for magnetically engaging with the ferromagnetic unit, and an activator configured for activating a lever of the fuel dispenser.

The presently disclosed refuelling system employs an adaptor tool and a ferromagnetic unit. Thus, the way of operating the adaptor tool, which engages with the dispenser of the fuels station, is simplified. The adaptor tool comprises a magnet, which engages with the ferromagnetic unit. The magnetic engagement between the adaptor tool and ferromagnetic unit holds the fuel dispenser unit during refuelling of a vehicle.

An important advantage of the present disclosure therefore is that the magnetic engagement improves the safety in the fuel station. Because of the magnetic engagement, the fuel dispenser unit may be separated from the adaptor tool in a safe manner. This implies that the force applied by the magnetic engagement can be controlled such that a safe refuelling environment can be achieved.

A further advantage of the disclosed kit is that the ferromagnetic unit can be added on to an existing fuel dispenser unit of a fuel station. This foresees that a robotic refuelling solution comprising the disclosed kit can be integrated in an existing fuel island, for example in the fuel island of a gas station.

Yet another advantage of the presently disclosed kit is that the disclosed kit is suitable for various types of fuel dispenser units of various fuel sources such as diesel, electricity, natural gas or hydrogen. Because the ferromagnetic unit is configured to connect with a fuel dispenser of any type of fuel, the disclosed fuel dispensing kit provides improved flexibility by offering an adaptability to fuel dispensers of various fuel types.

Another advantage of the presently disclosed kit is that the adaptor tool is suitable for various type of robot arms. For example, the robotic arm can be of a kind, which can work among humans, such as a collaborative robot or a cobot arm.

Preferably, the adaptor tool can be configured such that the disclosed kit can fulfil the safety requirements for operating in a close proximity with humans and explosives. Lightweight construction materials, minimized electrical components, rounded edges, sensors such as displacement sensors, pressure sensors, electrical safety shut on-off mechanisms and cameras may be adapted to ensure a safe configuration of the disclosed kit. This foresees an improved, compact and lightweight fuel dispensing adaptor kit.

Consequently, the present disclosure provides a fuel dispensing kit for a robot for automatically charging or refuelling a vehicle, wherein the kit is technically simple, can be manufactured cost-effectively, can be manufactured in a material-saving manner and can fulfil the safety requirement such that people are not endangered by operating the disclosed kit or the robot or the system associated with the disclosed kit.

DESCRIPTION OF THE DRAWINGS

The disclosure will in the following be described in greater detail with reference to the accompanying drawings.

DETAILED DESCRIPTION

Figure 1:
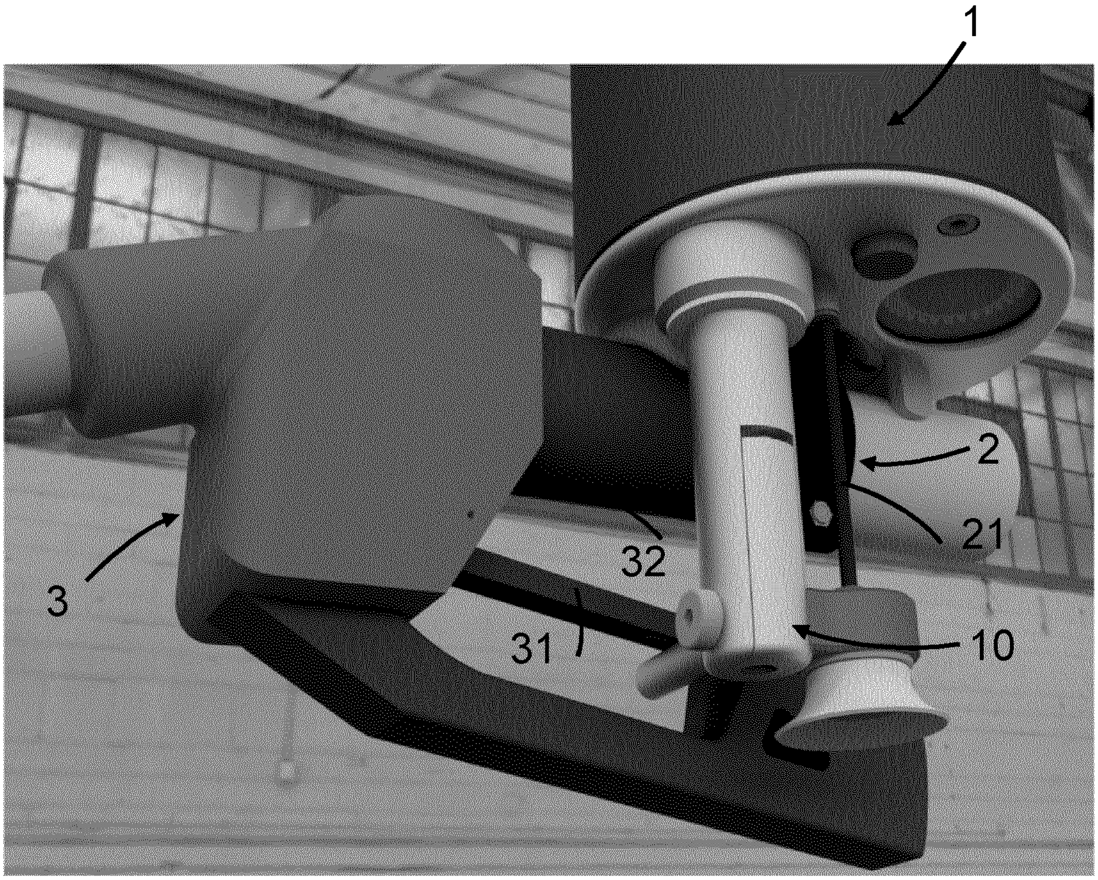
FIG. 1 shows one embodiment of the fuel dispenser adaptor kit engaging with a fuel dispenser.

As used herein, the term fuel dispenser refers to an apparatus that dispenses fuel to a vehicle. Generally, a fuel dispenser may be a fuel dispensing unit at a gas station providing fuel to a vehicle. The type of the fuel dispenser may differ in accordance with the fuel type that the vehicle consumes.

As used herein, the term fuel door refers to a part of the vehicle, such as a cap on the vehicle's body. Generally, when the fuel door is enabled such as opened or activated, fuel can be provided, for example through a fuel inlet. Typically, the fuel inlet may be positioned behind the fuel door.

As used herein, the term refuelling refers to providing an energy source. This means that refuelling may refer to the providing fluid fuels or gaseous fuels. Furthermore, refuelling may refer to the providing fuels of various energy sources, such as electricity.

In a first aspect, the present disclosure relates to a fuel dispenser adaptor kit. The fuel dispenser adaptor kit comprises an adaptor tool and a ferromagnetic unit. The ferromagnetic unit can be attached to a fuel dispenser. In an embodiment, the ferromagnetic unit is attached to a collar configured for being fastened to a fuel dispenser. Alternatively, the fuel dispenser can be provided such that the fuel dispenser comprises a ferromagnetic unit.

Advantageously, the adaptor tool comprising a magnet can engage with the ferromagnetic unit of the fuel dispenser. Thus, in a further embodiment, the adaptor tool and the fuel dispenser engage with each other by means of magnetic forces during refuelling operations.

In a preferred embodiment, the magnet can be operated by means of a cylinder comprising a piston situated inside the cylinder. In a further advantageous embodiment, the magnet can be attached to a first piston movable in a first cylinder, wherein the first piston is pneumatically, hydraulically or electrically controlled. This implies that the magnet can be attached to a rod or a bar that is engaging with the first piston.

An advantage of the presently disclosed adaptor kit is providing an effective, secure and light-weight design wherein the magnet can move within a cavity while providing a magnetic engagement. For example, when the piston moves inside the cylinder, the magnet positioned outside the cylinder in connection with the piston can be displaced within a cavity of the adaptor tool. In an embodiment, the magnet can be movable within the adaptor tool between an advanced position and a retracted position. When the magnetic engagement is limited or not activated, the piston can rest at a retracted position. When a refuelling operation is initiated, for example by engaging the adaptor tool with a dispenser unit, the magnetic elements attract each other and the piston can be displaced to an advanced position. Thus, the advanced position may be configured to be closer to the ferromagnetic unit than the retracted position. The advanced position therefore can be the position of the magnet when the magnet and the ferromagnetic unit are magnetically engaging with each other.

In an embodiment, the ferromagnetic unit can be secured to the fuel dispenser in a rigid manner. When the fuel dispenser is within a certain distance from the adaptor tool, the magnetic forces will attract the ferromagnetic unit of the fuel dispenser. The magnet within the adaptor tool may be configured to be displaced towards the ferromagnetic unit. The piston displaces within the cylinder, whereby the magnet connected to the piston can be displaced within the cavity of the adaptor tool from a retracted position to an advanced position.

In a preferred embodiment, the piston can reach a retracted position, where the magnet is further away from the ferromagnetic unit than the magnet's advanced position. The retracted position may be obtained when the magnetic force is aborted, for example, when the separation of the ferromagnetic unit and the adaptor tool is performed while the magnet is pneumatically actuated at the advanced position.

After the magnet moves forward towards the advanced position, the magnet can engage with the ferromagnetic unit of the fuel dispenser. A first pressure can be applied within the first cylinder acting on the first piston in the direction towards the retracted position, while maintaining the magnetic engagement with the ferromagnetic unit. When an external force is applied on the dispenser, the external force may be high enough to overcome the magnetic engagement force, such that the fuel dispenser disengages from the adaptor tool. The applied first pressure on the first cylinder will then move the magnet to the retracted position. In such a case, a first sensor can sense that a failure occurred. Generally, when refueling is completed without a failure and the fuel dispenser is positioned to a fuel dispenser holder of the fuel island, then a pressure within the cylinder can be applied such that the magnetic engagement between the magnet and the ferromagnetic unit is interrupted.

To provide position feedback to control systems in automated machinery, using sensors is a common practice. In order to detect the linear position of the piston in a pneumatic cylinder, one of the commonly used types of sensors can be a magnetic proximity sensor. The magnetic sensor can detect the magnetic field of a magnet integrated in a cylinder piston.

Thus, the piston can comprise a magnet and a sensor mounted onto the cylinder's body can indicate "on" or "off" based on proximity to the magnet. In an embodiment therefore, the adaptor tool can further comprise at least a first sensor unit configured for detecting that the first piston has reached a retracted position. Consequently, the first sensor unit can control the electrical power provided to the adaptor tool. The first sensor unit may be a reed switch, operated by an applied magnetic field, an electrical switch or a position sensor for sensing the position of a piston. The present disclosure therefore can be configured such that all electricity provided to the adaptor tool, for example if a vehicle drives off while the adaptor tool is engaging with the dispenser unit of the fuel station and the dispenser unit still is attached to the vehicle through the fuel inlet, can be turned off (or deactivated) based on the first sensor unit data. If the fuel dispenser attached to a fuel hose, through which fuel is provided, is detached from the fuel hose, some fuel may come out of the hose into the atmosphere around the adaptor tool. The switching off of the electricity means that the risk of explosion due to a spark from the adaptor tool is eliminated.

Thus, an advantage of the presently disclosed adaptor kit is that the adaptor kit can be configured for being electrically turned off when the first sensor unit detects that the first piston has reached a retracted position. Preferably, the sensor is of a type, which can generate a signal that can be used to control the electronics of the adaptor kit. The sensor can be a reed switch, which turns on under a magnetic field such that a circuit to generate a signal is closed. This indicates that, when a vehicle drives off while the adaptor tool is engaging with the dispenser unit of the fuel station and the fuel dispenser is positioned in the fuel inlet of the vehicle, then the ferromagnetic unit of the fuel dispenser will be detached from the magnet of the adaptor tool, and the first piston will displace to the retracted position, thereby activating the sensor such that the adaptor tool can be electrically turned off to avoid that a spark will ignite any leaked petrol. Depending on an estimated risk or a risk assessment, switching off the electricity means of the adaptor tool can be (de)activated. Alternatively, the adaptor tool may be configured to be turned off electrically when pressure in a gas tight cavity of the adaptor tool is below a threshold value.

Additionally, the magnet can be a rare-earth magnet, such as a neodymium magnet. The ferromagnetic unit or a part of a ferromagnetic unit can be manufactured from a material that can magnetically engage with the magnet. In an embodiment, the ferromagnetic unit is a steel ring. A part of the adaptor tool can be made of anti-static material in order to minimize a static built up of a charge that may cause a sudden discharge. A part of the adaptor tool may be made of aluminium.

Furthermore, the activator can comprise a stem and a tip, wherein the tip is configured for pulling or engaging with the lever of the fuel dispenser. Preferably, the tip of the activator can engage with the lever of the fuel dispenser, for example by a linear movement, such that the lever is displaced to activate refuelling. The position of the tip relative to the stem during refuelling may be a first position. In an advantageous embodiment, the tip is pivotable upon a force acting on the tip such that the tip can pivot from a first position in relation to the stem, wherein the tip is configured for pulling or engaging with the lever to a second position in relation to the stem, wherein the second position may be a position to which the tip can be displaced as a result of a force applied on the tip. This implies that if a force acting on the tip or the adaptor tool is above a predefined threshold, the tip of the activator can pivot.

Thus, in a further embodiment, upon a force acting on the tip above a predefined threshold, the tip can pivot from the first position in relation to the stem to the second position in relation to the stem, wherein the tip is configured for not pulling or not engaging with the lever. Advantageously, the tip of the adaptor tool can be configured such that when the adaptor tool is displaced in a direction other than a lever-activating direction, the tip can pivot, thereby avoiding damage such as breaking of the tip of the adaptor tool or of the lever of the fuel dispenser unit. This implies that, in case of a sudden drive off situation during refuelling or after refuelling with the fuel dispenser unit still in the fuel inlet, the tip can pivot. In such a drive off situation, the magnetic engagement of the ferromagnetic unit of the fuel dispenser unit with the magnet of the adaptor tool will be interrupted. But the tip can still engage with the lever of the fuel dispenser. Therefore, the tip can be configured such that the tip is pivotable above a certain threshold thereby decreasing harming of the adaptor tool or a robotic system provided in connection with the adaptor tool.

In an embodiment, the activator can be pneumatically, or hydraulically or electrically activated.

In a preferred embodiment, the activator can comprise a second piston movable in a second cylinder, wherein the second piston may be pneumatically or hydraulically controlled. Alternatively, the second piston can be electrically controlled. The stem can be connected to the second piston, so that by moving the second piston, the stem and the tip can be moved for controlling the activation of the lever.

Furthermore, the activator can comprise a spring. The activator can be configured for activating the lever of the fuel dispenser by means of a pressure acting on the second piston. Upon the magnetic engagement between the adaptor tool and the fuel dispenser unit, the second piston can be moved such that the tip of the adaptor tool can activate the lever of the dispenser unit. The lever of the fuel dispenser can have a second spring for biasing the lever towards a closed position where the fuel dispenser is not refuelling so that when no other force is acting on the lever, the fuel dispenser is closed or is closing by itself. During refuelling, the force from the activator acting on the lever can balance the forces from the spring and from the second spring so that the lever is in an intermediate refuelling state. The fuel dispenser used for example for petrol and for diesel can have a fuel dispenser sensor for detecting when the petrol/diesel level has reached the fuel dispenser. When the fuel dispenser sensor detects that the petrol/diesel level has reached the fuel dispenser, the fuel dispenser is shut off for avoiding petrol/diesel overflow. When the fuel dispenser is shut off, the second spring will not act anymore on the lever. This is how the fuel dispenser in general is constructed.

The second piston may be configured such that the second piston thereby the tip connected to the second piston can move between an advanced position wherein the second cylinder is not pressurized and an activated position wherein the second cylinder is pressurized such that the lever of the fuel dispenser can be loaded, and wherein the lever is in the intermediate refuelling state. When the fuel dispenser sensor detects that the petrol/diesel level in a fuel tank of the vehicle has reached the fuel dispenser sensor, the fuel dispenser shuts off and the second spring is not acting on the lever. The fuel dispenser sensor may be an overflow sensor. This implies that the fuel dispenser can be shut-off limiting the supply of fuel when the fuel level rises above a level relative to an orifice of a fuel nozzle. Alternatively, the fuel dispenser sensor can be configured such that the fuel dispenser can be shut-off at a predefined level of fuel supply. When the fuel dispenser sensor has detected that the fuel level in the fuel tank of the vehicle has reached the fuel dispenser sensor, then the forces acting on the lever are only the force from the activator and the force from the spring, which is less than the force acting on the second piston. The second piston can then be moved to a fully activated position away from the advanced position.

In an embodiment, the spring can be configured for preventing the activator from reaching the fully activated position during refuelling when the pressure is acting on the second piston. The fully activated position may be, for example, a configuration wherein the piston of the second cylinder is further retracted than the activated position. An advantage of the spring is that the spring will be loaded during refuelling such that the pressure within the second cylinder can be arranged accordingly. An advantage of this feature is that the load carrying capacity of the second piston for controlling the activator can be enhanced by means of a spring engagement.

Preferably, the adaptor tool can be configured such that when the shut-off mechanism of the fuel dispenser is activated, because the spring of the fuel dispenser stops acting on the lever, the piston of the second cylinder can move to a further retracted position. In an embodiment, the second sensor unit can detect a configuration of the adaptor tool based on an activated shut-off mechanism. An advantage of the second sensor unit therefore is that the sensor can sense when the refuelling process is completed. Consequently, in a system comprising the presently disclosed approach, the system, based on sensor data, can detect a completion of refuelling process and place the fuel dispenser to the fuel island of the gas station.

Thus, in an embodiment, the adaptor tool can further comprise a second sensor unit, wherein the second sensor unit is configured for deactivating the activator when the activator reaches the fully activated position. The fully activated position of the activator can be one in which the piston retracts further away from the lever, or when the spring is loaded further in comparison to the load during refuelling. This foresees that, when the shut-off mechanism activates, the reaction force of the lever can be configured such that the spring is loaded further, and the piston retract further, which can activate the second sensor. The second sensor may be a reed sensor, pressure sensor, optical sensor, position sensor, laser sensor or any sensor configured for detecting completion of the refuelling process.

Furthermore, in an embodiment, the adaptor tool can have a receiving surface for receiving the fuel dispenser, wherein the receiving surface is concave for orienting the fuel dispenser.

In an embodiment, the adaptor tool further comprises a sealing unit configured for separating the magnet and the ferromagnetic unit when the magnet engages with the ferromagnetic unit. The sealing unit can be provided as a part of or continuation of the receiving surface of the adaptor tool. In a further embodiment, the sealing unit can comprise a non-magnetic membrane. The non-magnetic membrane can be configured such that when the receiving surface receives the ferromagnetic unit of the fuel dispenser, the non-magnetic membrane can locate between an upper surface of the ferromagnetic unit and the lower surface of the magnet. Furthermore, the non-magnetic membrane can seal the inside of the adaptor tool from the outside environment.

The membrane can be made of a non-magnetic material. An advantage of providing a sealed membrane between the magnet and the ferromagnetic unit can be to enhance the efficiency of the magnetic engagement. During the magnetic engagement, due to high magnetic forces, wear modes, such as adhesive wear, can be activated. As a result, the efficiency in holding the ferromagnetic unit as well as the lifetime of the magnetic components may be affected adversely. Thus, a thin non-magnetic membrane with high durability and strength can increase the efficiency of the magnetic engagement while sealing the adaptor tool from the outside environment.

In a further embodiment, the sealing unit can comprise a spring. The spring can be compressed when the magnet engages with the ferromagnetic unit. During the disengagement of the magnet and the ferromagnetic unit, the spring can be unloaded. Because of this configuration, a flexible engagement can be provided. The springs can therefore provide flexible design to cope with misalignment of the membrane, for example when the membrane has less elasticity.

In one embodiment, the adaptor kit can comprise a suction cup configured for engaging with the fuel door of a vehicle. The suction cup can use air pressure to adhere to a surface, such as the fuel door of a vehicle. Preferably, the pressure between the suction cup and the fuel door surface can be a negative pressure such that a partial vacuum can be provided. For example, using a vacuum ejector, where by blowing pressurized air through an injector, a vacuum can be created. Advantageously, the pressure in a merged area between the suction cup and the fuel door can be adjusted.

In a preferred embodiment, the suction cup may have an opening configured for providing vacuum between the suction cup and the fuel door. When the pressurized air-flow is terminated, the vacuum in the suction cup circuit can be eliminated by sucking air back through an exhaust of the injector.

In an embodiment, the adaptor kit can comprise a spring for biasing the suction cup towards a retracted position. The spring can be provided in connection with a concave ring configured such that the in a retracted position of the adaptor tool, the suction cup can sit-in the concave ring and/or hold by the spring engaged concave ring or a spring-engaged-housing. The suction cup can therefore be maintained in a position defined by the spring-engaged-housing, generally unless the suction cup engages with the fuel door. When the suction cup engages with the fuel door, the spring-engaged-housing can move in accordance with the movement of the adaptor tool. Thus, when the suction cup engages with the fuel door the spring can be compressed in accordance with the movement of the spring-engaged-housing. An advantage of the spring engagement may be provision of a flexible movement of the suction cup while ensuring that the suction cup can be maintained stably within a housing, as long as the suction cup is not engaging with the fuel door.

In an embodiment, the adaptor tool can comprise an optical sensor configured for capturing an image of a fuel door of a vehicle. Furthermore, the optical sensor, such as a camera, can capture images of a fuel inlet of the vehicle. In a further embodiment, the adaptor tool comprises an optical sensor configured for capturing an image of a fuel inlet of a vehicle such that the fuel dispenser can be guided to the fuel inlet. An advantage of the presently disclosed adaptor tool is that the guidance of the suction cup to the fuel door and/or the guidance of the fuel nozzle to the fuel inlet can be enhanced. Because the optical sensor, after opening the fuel door, can detect the fuel inlet to determine the exact position so the fuel nozzle (fuel dispenser) can be inserted. While opening and closing a fuel door and/or engaging the fuel nozzle with the fuel inlet, a visual guidance can support an accurate refuelling operation. Accordingly, because the spring-engaged-housing can maintain the suction cup, the optical sensor can have a clearer image of the fuel door without the disturbance of the suction cup or any other components of the adaptor tool.

An intended use of the presently disclosed adaptor kit may be in potentially explosive atmospheres requiring safety precautions. In an explosive atmosphere, when there is enough flammable substance mixed with air, a source of ignition may cause an explosion. Thus, the presently disclosed adaptor kit may comprise a protection means for protecting workers, customers or goods potentially at risk.

In an embodiment, any or any combination or all of the group of an optical sensor, a first sensor, a second sensor, the activator, a light source, an inductive sensor can be positioned in a gas tight cavity with a gas inlet configured for receiving gas to pressurize the cavity. The optical sensor, the first sensor, and the second sensor can be the optical sensor, the first sensor, and the second sensor, respectively, mentioned above and can have any, any combination of or all the features and advantages of the optical sensor, the first sensor, and the second sensor, respectively, as described above. Preferably, the electronic elements of the adaptor tool can be located in a cavity within the adaptor tool such that the cavity housing the electronic elements can be pressurized. The electronic elements may be various sensors used for improving the presently disclosed adaptor tool. The sensors may be reed sensors, sensing the piston movement, an inductive sensor or a light source. The light source may be any light source provided for illumination preferably for the optical sensor. The inductive sensor furthermore is configured such that the adaptor kit can be operated manually. Advantageously, the adaptor tool is pressurized such that a predefined pressure level can be maintained so that any explosive gas is prevented from reaching the electronics inside the adaptor tool.

Furthermore, an advantage of the disclosed adaptor kit is that the adaptor kit can be an add-on to existing fuel stations. Thus, the fuel dispenser may be a fuel dispenser for dispensing conventional fuels such as petrol or diesel or non-conventional fuels such as hydrogen or electricity.

The present disclosure further relates to a robotic refuelling system for automatically operating a fuel station for refuelling vehicles. The robotic refuelling system can comprise detection units for identifying a vehicle, a robot arm and an adaptor kit. The system can be configured for detecting and identifying the vehicle and controlling the robot arm. Preferably, the adaptor tool can engage with the robot arm. Thus, the system can be configured for controlling the adaptor tool to engage a fuel dispenser of the fuel station thereby refuelling a vehicle.

In a preferred embodiment, the robot arm can be a collaborative robot arm. An advantage of the presently disclosed robotic refuelling system is that the adaptor kit is configured for being guided by means of a collaborative robot arm, which is designed to work among humans and provides a safe work environment outside of a dedicated work cell.

In one embodiment, the robotic refuelling system can be configured such that the suction cup can follow a predefined coordinate. The predefined coordinate can be defined in accordance with data regarding two coordinates provided to the system. The two coordinates may be related to a coordinate when the fuel door is active for a fuel intake (open) and a coordinate when the fuel door is not activate (close). Thus, in a further embodiment, the predefined coordinate can be defined by means of a two-point teach-in. The two-point teach-in can apply to opening and closing the fuel door.

In an embodiment, the suction cup can be configured to follow a predefined path, wherein the predefined path is defined by a straight line between two-points. The two-points are two coordinates representing the coordinates of the suction cup when the fuel door is closed and open. For each vehicle model, the robotic refuelling system can be taught these two coordinates.

Preferably, the suction cup can be hold by means of a housing, extending from the activator, such as from the stem of the activator. The housing can be the spring-engaged-housing. The suction cup can therefore be held in place when the activator is at an extended position. When the suction cup is connected to the fuel door, the activator can move back to a retracted position away from the suction cup, such that the suction cup may be free to move. Preferably, the movement of the suction cup between the fixed and free configurations are controlled by the activator of the adaptor tool such that a two-point teach-in can be applied. Thus, in an embodiment, the adaptor tool can be configured such that the adaptor tool can displace while the suction cup engages with the fuel door of the vehicle.

A great advantage of two-point teaching is providing an efficient and a fast teaching method. The system can be configured for receiving data related to two positions of the suction cup. The first position may be when the suction cup merges with the fuel door initially, and the second position of the suction cup may, for example, be when the fuel door is available for a fuel intake. A great advantage of two-point teach-in is the providing of an efficient and fast teaching method leading to a cost-efficient automatic solution. There is no need for a robotic refuelling system to adapt to size and/or to rotational axis of the fuel door for each single type of vehicle.

Furthermore, in an embodiment, the adaptor can comprise an inductive sensor configured for activating a free-drive function such that the adaptor tool can be controlled manually. A manual control (free-drive function) of the adaptor tool may be desirable especially during vehicle teach-in process. Thus, in an embodiment, the adaptor tool and/or the robotic refuelling system can comprise a button unit, wherein the button unit in activated state is configured for activating a free-drive function. In an advantageous embodiment, the button unit can be configured such that the button unit can be an airtight button unit, such that the button unit can be sealed to the adaptor tool. Because the button unit is airtight, any explosive gas can be prevented from reaching the electronics. Consequently, the button unit can be an explosive proof button unit, and can fulfils the requirements that an equipment will need in order to work safely in explosive environment without causing any accident. The button unit can be purged under an over pressurized robotic refuelling system. Advantageously, an explosion-proof adaptor tool and/or the robotic refuelling system can be provided.

The button unit can comprise a button, which can be activated by a user. The activation of the button unit may also be provided automatically, such as by a control system. The button unit can further comprise a sealing member to provide a sealed connection to the adaptor tool. In a further embodiment, the button unit can comprise a sensor, such as an inductive sensor, for sensing when the button unit is at an activated position. An activated position of the button unit can be desirable for resetting a refuelling operation, activating a manual refuelling process, retracting the robot arm and/or for teach-in processes. The activated position may additionally be desirable to reset the robotic refuelling system. For example, if a driver experiences an error, and the robotic refuelling system is stopped, then the driver can reset the refuelling system without the need of a technician on the site.

Consequently, an advantage of the disclosed system is that the adaptor tool can engage with a fuel dispenser unit of a fuel station, prepare a fuel door of a vehicle for a fuel intake, provide the fuel dispenser to a fuel-receiving part of the vehicle, and provide the fuel.

DETAILED DESCRIPTION OF THE DRAWINGS

The present disclosure will now be described more fully hereinafter with reference to the accompanying exemplary embodiments shown in the drawings when applicable.

However, it is to be noted that the presently disclosed system and method may be embodied in various forms. The hereby provided embodiments are to guide a thorough and complete disclosure. Hence, embodiments set forth herein should not be interpreted as limiting but be construed as a tool for delivering the scope of the disclosure to those who are skilled in the art. Same reference numbers refers to the same element throughout the document.

FIG. 1 shows one embodiment of the fuel dispenser adaptor kit engaging with a fuel dispenser 3. The adaptor kit comprises an adaptor tool 1 and a ferromagnetic unit 2. The ferromagnetic unit 2 comprises a circular collar 21, which is assembled around a tubular holding frame 32 of the fuel dispenser 3.

Figure 2:
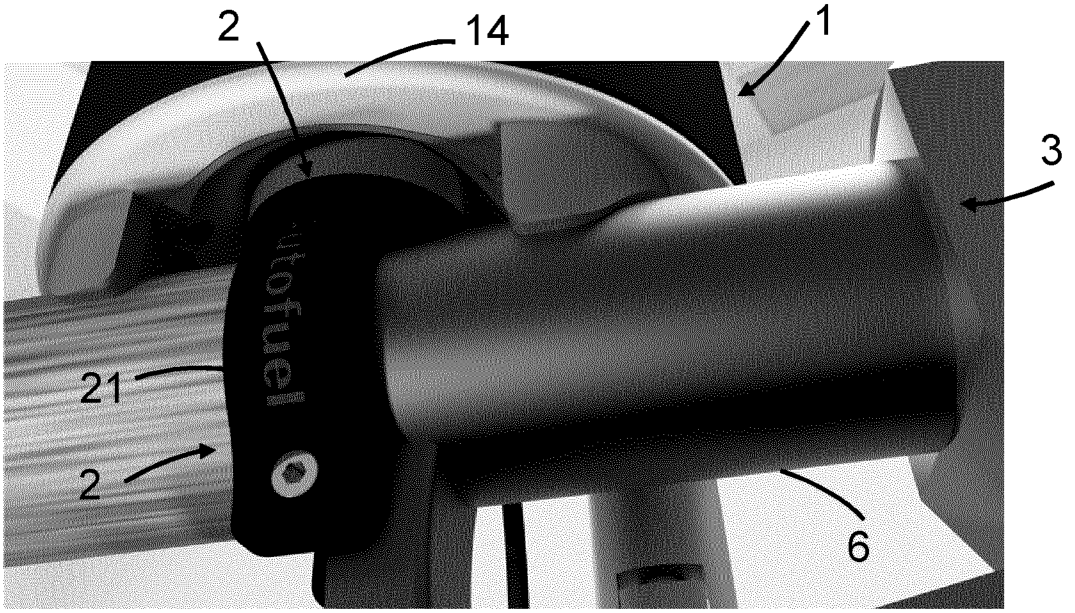
FIG. 2 is one embodiment of the ferromagnetic unit attached to a fuel dispenser.
Figure 3:
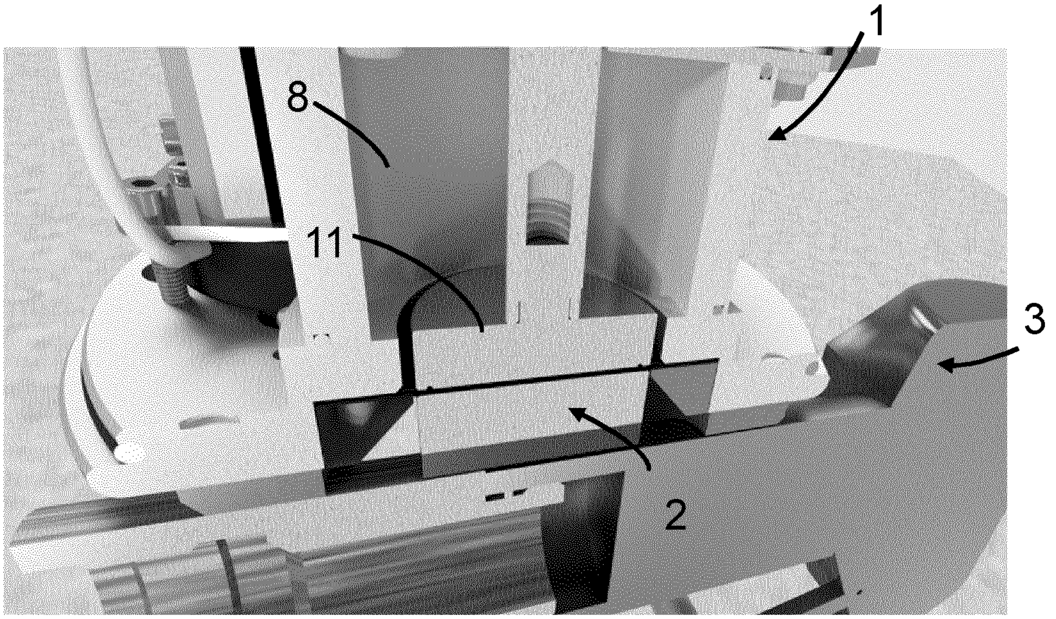
FIG. 3 is one embodiment of the detailed cross section view of the ferromagnetic unit engaging with adaptor tool.

One embodiment of the detailed view of the ferromagnetic unit 2 attached to a fuel dispenser 3 is shown in FIG. 2. The ferromagnetic unit 2 can be a ferromagnetic element such as a cylinder made of stainless steel or a plated steel such as a nickel-plated steel. The ferromagnetic unit 2 is secured to the collar 21 such that the upper surface of the ferromagnetic unit 2 engages with a cylindrical magnet situated in the adaptor tool 1. The bottom surface 14 of the adaptor tool 1 has a circular hole through which the ferromagnetic unit 2 is received and engages with the magnet 11 as shown in FIG. 3. Alternatively, the ferromagnetic unit 2 can be integrated in the fuel dispenser, in which case the circular collar 21 is unnecessary.

Figure 4A:
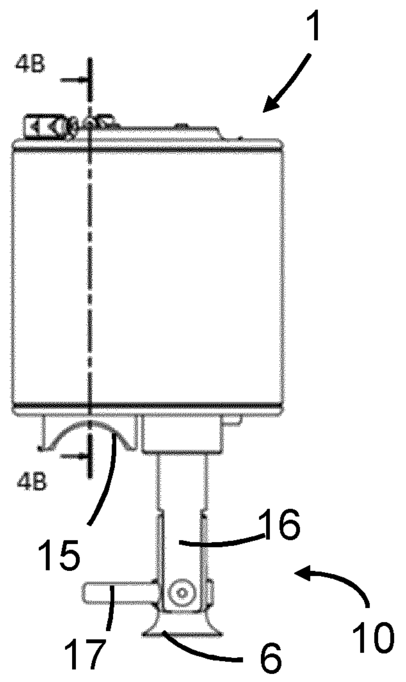
FIG. 4A is one embodiment of the adaptor tool and a cross section location.
Figure 4B:
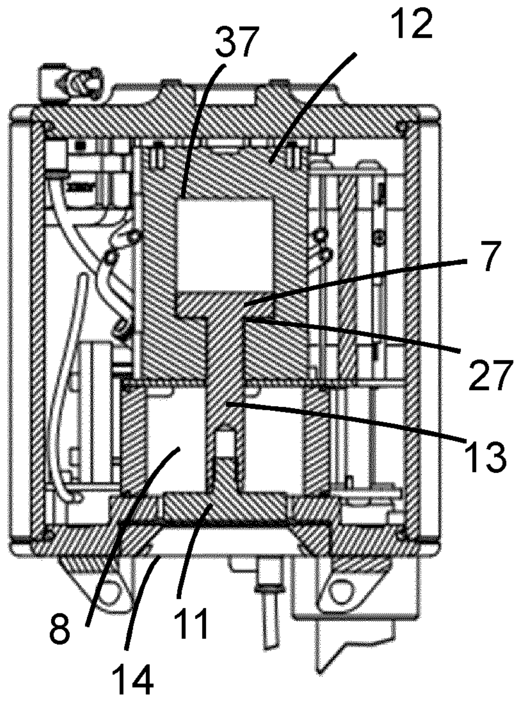
FIG. 4B shows one embodiment of the cross section side view of the adaptor tool.

FIG. 4A shows a location of the cross section line for an embodiment of the cross sectional side view of the adaptor tool. The details of cross sectional side view is given in FIG. 4B. Adaptor tool 1 comprises a first cylinder 12 such as a pneumatic cylinder and a piston 7 movable in the first cylinder 12 in the direction of the magnetic pulling forces. The piston 7 comprises a rod 13 extending from the centre of the piston 7 such that the rod 13 is connected to the magnet 11 at the other end. The magnet 11 can be connected to the rod 13 by means of a threaded-circular extension, extending from the centre of the magnet 11 and connected to the threated hole in the rod 13. The magnet 11 is movable in a cavity 8 between an advanced position and a retracted position. FIG. 3 and FIG. 4B show an embodiment of the advanced position. At an advanced position, the magnet 11 engages magnetically with the ferromagnetic unit 2. Because the ferromagnetic unit 2 is secured to the fuel dispenser 3, when the adaptor tool 1 approaches to the fuel dispenser 3, the piston moves towards a bottom wall 27 in the first cylinder 11 and the magnet 11 moves within the cavity 8 towards the bottom surface 14 of the adaptor tool 1 for pulling the ferromagnetic unit 2.

Furthermore, the adaptor tool 1 comprises at least a first sensor for detecting that the first piston 7 has reached a retracted position. The retracted position is further away from the ferromagnetic unit 2 compared to an advanced position at which the adaptor tool engages with the fuel dispenser. The retracted position may for example be reached when the fuel dispenser has been removed mistakenly. In such a case, when the magnetic force is aborted, the piston 7 is pushed towards the upper wall 37 of the first cylinder 12 wherein the upper wall 37 is the opposite wall relative to the bottom wall 27 to which the piston 7 is pulled under the magnetic field. The sensor such as a reed sensor is located at the upper side of the first cylinder 12 close to the upper wall 37 such that the sensor can sense the magnetic field introduced by a magnet embedded in the piston 7. Thus, when the sensor detects the retracted position of the piston 7, the adaptor tool 1 can be controlled accordingly for example by being turned off electrically.

Figure 5A:
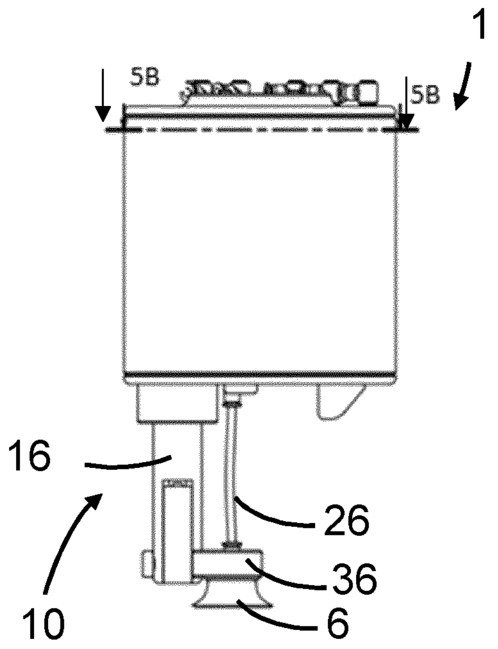
FIG. 5A is one embodiment of the adaptor tool and a cross section location.
Figure 5B:
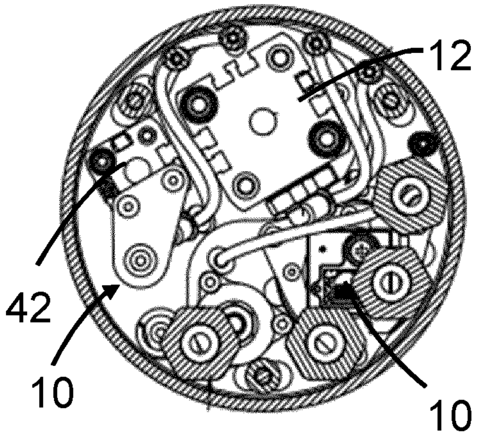
FIG. 5B shows one embodiment of the cross section top view of the adaptor tool.

FIG. 5A shows one embodiment of the adaptor tool and a cutting plane section. A corresponding embodiment of the detailed cross sectional top view of the adaptor tool is shown in FIG. 5B. The adaptor tool 1 further comprises an activator 10, configured for engaging with a lever 31 (see FIG. 1) of the fuel dispenser 3. The activator 10 comprises a second piston movable in a second cylinder 42, wherein the second piston is pneumatically or hydraulically or electrically controlled. The piston of the second cylinder 42 has a working mode between the retracted and advanced. At a retracted position, the piston of the second cylinder is configured such that the activator engages with the lever of the fuel dispenser.

Figure 6:
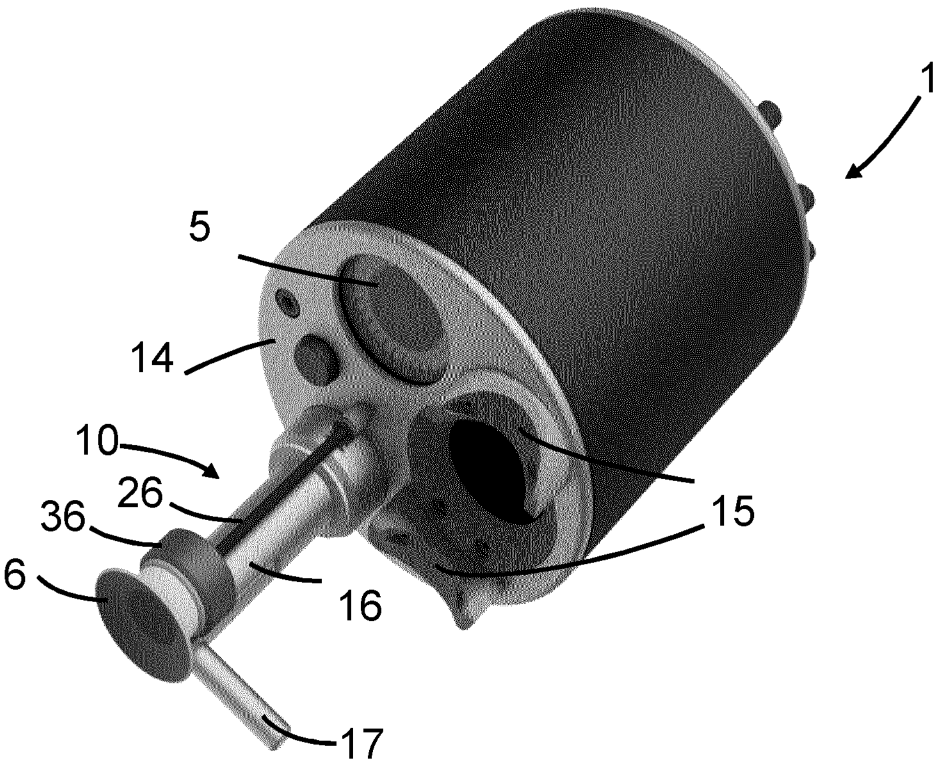
FIG. 6 shows one embodiment of the adaptor tool.

The activator 10 further comprises a stem 16 extending longitudinally from the bottom surface 14 of the adaptor tool 1 as shown in FIG. 4A and FIG. 6. A tubular tip 17 is attached to the stem 16 such that the tip 17 extends from a side of the stem 16. The tip 17 therefore can pull or engage with the lever 31 of the fuel dispenser 3 as shown in FIG. 1.

Figure 7:
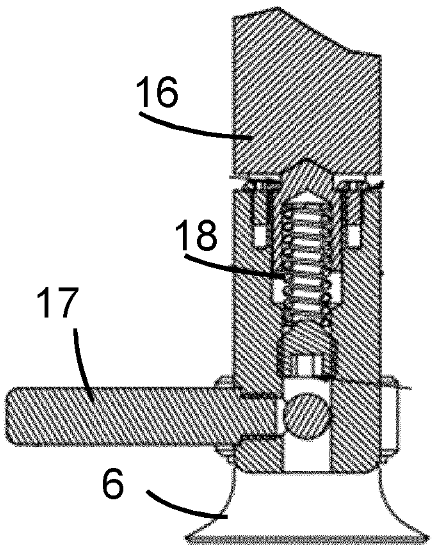
FIG. 7 shows one embodiment of the cross section of the activator.
Figure 8:
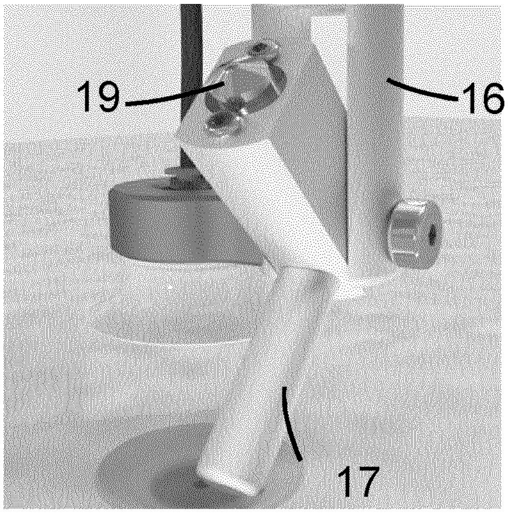
FIG. 8 is one embodiment of the activator at a lever-failure position.

FIG. 7 shows one embodiment of the cross section of the activator 10. The activator 10 comprises a spring 18 configured for being loaded during refuelling. Additionally, the tip 17 is pivotable from a first position in relation to the stem 16. During refuelling, the tip 17 is perpendicular to the stem 16 such that the tip can be activated and moved linearly in accordance with the movement of the piston of the second cylinder 42 and engage with the lever of the fuel dispenser 3. Upon a force acting on the tip 17 above a predefined threshold, the tip 17 can pivot in relation to the stem 16 to a second position, where the tip is more or less collinear with the stem, resulting in a lever-failure position. An embodiment of the activator 10 at a lever-failure position is shown in FIG. 8. In this lever-failure position, the fuel dispenser 3 can easily slip out of the grip of the adaptor tool 1 so that the adaptor tool 1 and/or the robot arm holding the adaptor tool will not be destroyed if a driver accidentally drives away with the fuel dispenser still attached to the vehicle. The adaptor tool is configured such that the tip 17 engages with the stem 16 of the activator 10 by means of a conical surface 19. An advantage of the conical surface 19 arrangement and a pivotable tip 17 design is that pivot of the tip 17 under a force resulting in a lever-failure position can be accommodated while reducing the damage of the tool parts.

According to FIG. 6, the adaptor tool 1 may further comprise receiving surfaces 15 for receiving the fuel dispenser 3. The receiving surface 15 is concave for orienting the fuel dispenser 3. Additionally, the adaptor tool 1 comprises a camera 5 configured for capturing images such that a suction cup 6 can be guided to the fuel door and the fuel dispenser can be guided to the fuel inlet of the vehicle. Thus, the camera 5 is located within a cavity in the adaptor tool 1, wherein the cavity has an opening on the bottom surface 14 of the adaptor tool 1 such that the camera 5 can capture images from the bottom surface 14.

When the suction cup 6 engages with the fuel door of the vehicle, vacuum between the suction cup 6 and the fuel door is created. The suction cup 6 is connected to a vacuum tube 26 (see FIGS. 5A and 9A). The vacuum tube 26 can be arranged such that the vacuum between the suction cup and the fuel door can be provided by vacuum ejector, providing a simple and cost-effective solution. When the pressurized air is stopped the vacuum will be aborted. When the pressurized air-flow is terminated the vacuum in the suction cup 6 circuit is eliminated by sucking air back through the exhaust of the vacuum tube 26. Alternatively, a type of a vacuum pump can be configured for providing a vacuum between the suction cup and the fuel door.

A concave ring 36 attached to the stem 16 can hold the suction cup 6 in place when the stem 16 is at an extended position. At the extended position, the activator 10 is extended longitudinally from the bottom surface 14 of the adaptor tool compared to retracted position of the activator 10, wherein the piston of the second cylinder 42 can retract the stem 16 and/or the tip 17 of the activator 10.

Figure 9A:
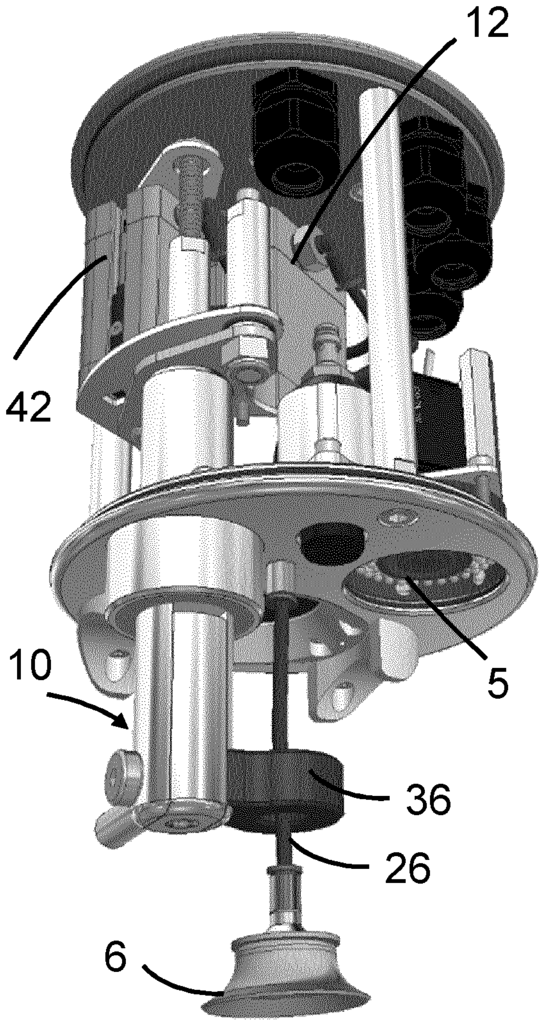
FIG. 9A shows one embodiment of the adaptor tool when the activator is at a retracted position.
Figure 9B:
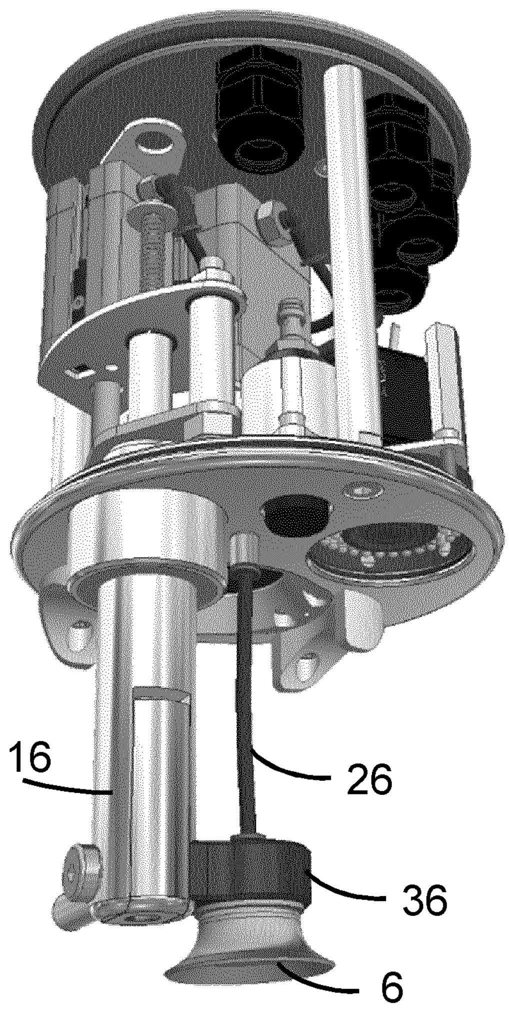
FIG. 9B shows one embodiment of the adaptor tool when the activator is at an extended position.

In an embodiment of an extended position shown in FIG. 9B, the suction cup 6 is fixed. When the suction cup 6 is connected to the fuel door, the stem 16 and therefore the concave ring 36 moves back to the retracted position as shown in FIG. 9A, so the suction cup 6 is free to move. Therefore, the adaptor tool can stay in the same orientation relative the vehicle while opening the fuel door, which rotates for example 90 degrees.

Alternatively, there may be one or more magnets in the concave ring 36 and a ferromagnetic ring attached to the suction cup 6, such that when the suction cup 6 is not connected to the fuel door but the stem 16 is operated for activating the lever, the suction cup 6 can be maintained in the concave ring 36. Holding the suction cup 6 in the concave ring 36 may lower the stress on the vacuum tube 26. Additionally, the suction cup 6 can be hold by the concave ring 36 when operating the lever of the fuel dispenser and/or during possible interference of the refuelling operation.

Furthermore, the two-point teach-in can be applied to opening and closing the fuel door due to the freedom of the move of the suction cup 6.

Figure 10:
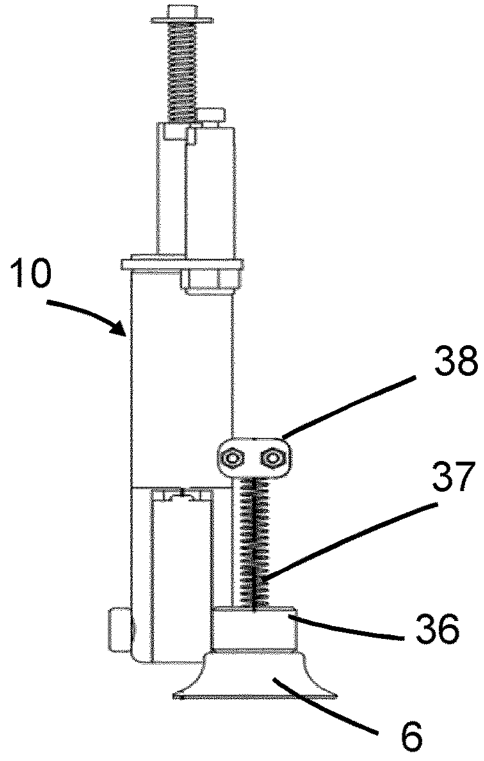
FIG. 10 shows one embodiment of an activator assembly and a suction cup assembly.

FIG. 10 shows an embodiment of an activator assembly having the activator 10 and a suction cup assembly comprising a spring-engaged housing. The spring-engaged housing comprises a spring 37, a stopper 38 and a concave ring 36. The spring 37 is provided around the vacuum tube (not shown), which provides vacuum to the suction cup 6. The spring 37 is fixed to a stopper 38 and provided between the stopper 38 and the concave ring 36. The spring 37 presses the concave ring 36 against the suction cup 6, thus when the suction cup 6 is not activated, e.g., not engaging with a fuel door, the spring 37 can be configured such that the suction cup 6 stays within the concave ring 36 housing. The spring engagement can be an alternative solution to the ferromagnetic magnetic ring attachment of the suction cup.

Figure 11:
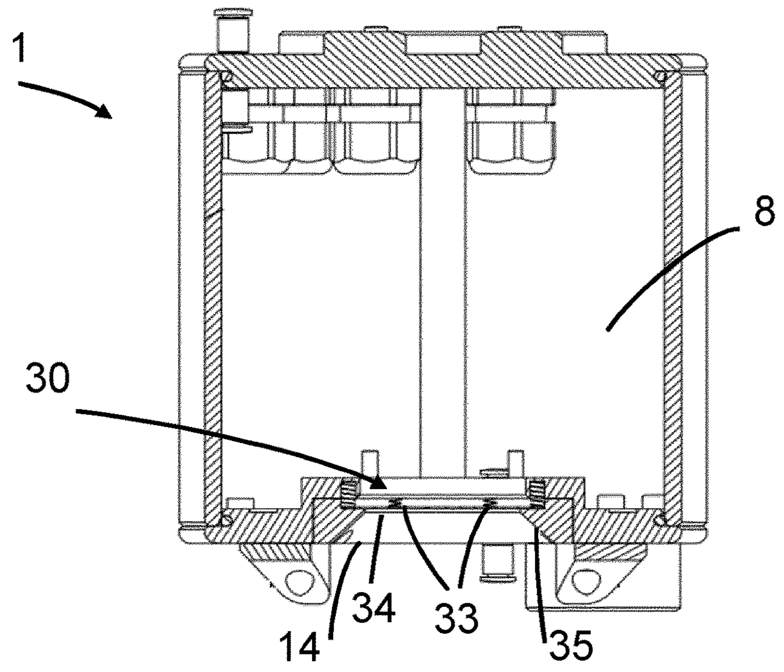
FIG. 11 shows an embodiment of the cross section side view of the adaptor tool.

FIG. 11 shows one embodiment of the cross section side view of the adaptor tool 1. The cross section line for this embodiment is similar to the location of the cross sectional side view of the adaptor tool shown in FIG. 4A. In the drawing in FIG. 11, some of the parts that the adaptor tool 1 accommodates, such as the cylinder, the piston, the magnet, are hidden for simplifying the presentation. The adaptor tool 1 comprises a sealing unit 30 having a separation membrane 34 towards the bottom surface 14 of the adaptor tool 1, which separates and seals the inner cavity 8 of the adaptor tool 1 from the outside.

The bottom surface 14 of the adaptor tool has a conical indentation 35 for receiving the ferromagnetic unit (not shown) positioned on the fuel dispenser (not shown). The membrane 34 is located at the top of the indentation 35 such that the membrane can engage with the bottom surface of the magnet and the top surface of the ferromagnetic unit thereby separating the ferromagnetic unit and the magnet during the magnetic engagement of the magnet with the ferromagnetic unit. The membrane 34 is made of a non-magnetic material. The membrane 34 is arranged with springs 33 provided within the cavity 8 of the adaptor tool 1. The springs 33 are arranged to improve a smooth engagement and disengagement of the magnet above the membrane 34 with the ferromagnetic unit positioned on the fuel dispenser and therefore below the membrane 34.

Figure 12:
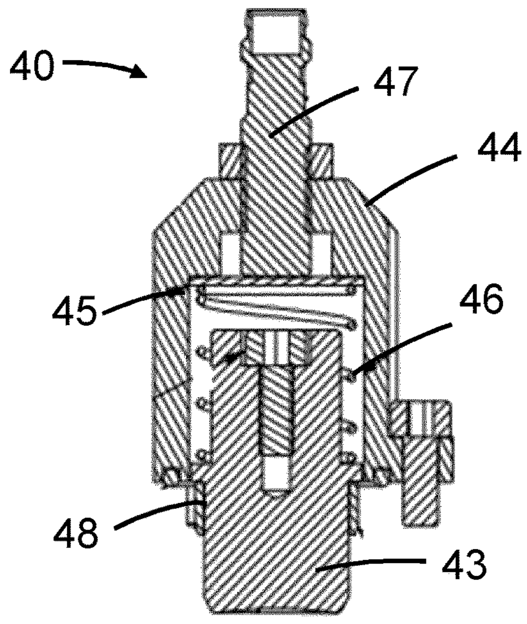
FIG. 12 shows an embodiment of a tool-free-drive button assembly.

FIG. 12 shows an embodiment of a button unit, such as a tool-free-drive button assembly 40. An activation of the button 43, in this embodiment by pushing the button, can be advantageous for example for the purposes of teaching, resetting, free driving, retracting the adaptor tool. The activation button can also be activated manually and/or automatically. The free-drive button assembly 40 comprises a housing 44 assembled to the adaptor tool in a sealed manner. The housing 44 partly accommodates at the lower end a button 43 that can be accessed by a user. The button 43 engages with a sleeve bearing 48 such that the button can be pushed towards the cavity of the housing 44. Within the housing 44, a spring 46 engages with an upper portion of the button 43. A button-seal 45 is provided within the housing above the spring 43. Above the button-seal 45, an inductive sensor 47 is placed. When the button 43 is pushed, the sensor 47 will sense the action of pushing.

The invention claimed is:

1. A fuel dispenser adaptor kit comprising an adaptor tool and a ferromagnetic unit configured for being part of or attached to a fuel dispenser, wherein the adaptor tool comprises a magnet configured for magnetically engaging with the ferromagnetic unit, and an activator configured for activating a lever of the fuel dispenser.

2. The adaptor kit according to claim 1, wherein the activator is pneumatically or hydraulically or electrically activated.

3. The adaptor kit according to claim 1, wherein the magnet is movable within the adaptor tool between an advanced position and a retracted position, wherein the advanced position is configured to be closer to the ferromagnetic unit than the retracted position, when the magnet and the ferromagnetic unit are magnetically engaging with each other.

4. The adaptor kit according to claim 1, wherein the magnet is attached to a first piston movable in a first cylinder, wherein the first piston is pneumatically or hydraulically or electrically controlled.

5. The adaptor kit according to claim 4, wherein the adaptor tool further comprises at least a first sensor unit configured for detecting that the first piston has reached a retracted position.

6. The adaptor kit according to claim 5, wherein the adaptor kit is configured for being electrically turned off, when the first sensor unit detects that the first piston has reached the retracted position.

7. The adaptor kit according to claim 1, wherein the activator has a stem and a tip attached to the stem, wherein the tip is configured for pulling or engaging with the lever of the fuel dispenser.

8. The adaptor kit according to claim 7, wherein the tip upon a force acting on the tip above a predefined threshold is pivotable from a first position in relation to the stem, wherein the tip is configured for pulling or engaging with the lever to a second position in relation to the stem, wherein the tip is configured for not pulling or not engaging with the lever.

9. The adaptor kit according to claim 1, wherein the activator comprises a second piston connected to the stem and movable in a second cylinder.

10. The adaptor kit according to claim 9, wherein the activator comprises a first spring, wherein the activator is configured for activating a lever by a pressure acting on the second piston, and wherein the first spring is configured for preventing the activator from reaching a fully activated position during fill-up when the pressure is acting on the second piston, and wherein the first spring is configured for allowing the activator to reach the fully activated position when the fill-up is terminated and while the pressure is acting on the second piston.

11. The adaptor kit according to claim 10, wherein the adaptor tool further comprises a second sensor unit, wherein the second sensor unit is configured for deactivating the activator, when the activator reaches the fully activated position.

12. The adaptor kit according to claim 1, wherein the fuel dispenser is a fuel dispenser for dispensing conventional fuels, or non-conventional fuels.

13. The adaptor kit according to claim 1, comprising a suction cup configured for engaging with a fuel door of a vehicle.

14. The adaptor kit according to claim 13, wherein the suction cup has an opening configured for providing vacuum between the suction cup and the fuel door.

15. The adaptor kit according to claim 13, wherein the adaptor kit comprises a second spring for biasing the suction cup towards a retracted position.

16. The adaptor kit according to claim 1, wherein the ferromagnetic unit is attached to a collar configured for being fastened to a fuel dispenser.

17. The adaptor kit according to claim 13, wherein the adaptor tool comprises an optical sensor configured for capturing an image of a fuel door of a vehicle such that the suction cup can be guided to the fuel door and open the fuel door.

18. The adaptor kit according to claim 1, wherein the adaptor tool comprises an optical sensor configured for capturing an image of a fuel inlet of a vehicle such that the fuel dispenser can be guided to the fuel inlet.

19. The adaptor kit according to claim 1, wherein any or any combination or all of the group of an optical sensor, a first sensor, a second sensor, the activator a light source for providing illumination for the optical sensor, and an inductive sensor configured such that the adaptor kit can be operated manually, are positioned in a gas tight cavity with a gas inlet configured for receiving gas to pressurize the cavity.

20. The adaptor kit according to claim 1, wherein the adaptor tool has a receiving surface for receiving the fuel dispenser, wherein the receiving surface is concave for orienting the fuel dispenser.

21. The adaptor kit according to claim 1, wherein the adaptor tool comprises a sealing unit configured for separating the magnet and the ferromagnetic unit when the magnet engages with the ferromagnetic unit.

22. The adaptor kit according to claim 21, wherein the sealing unit comprises a non-magnetic membrane.

23. A robotic refuelling system for automatically operating a fuel station for refuelling vehicles, comprising:

a robot arm; and an adaptor kit according to claim 1;

wherein the system is configured for controlling the robot arm and the adaptor tool to engage a fuel dispenser of the fuel station and refuel the vehicle.

24. The robotic refuelling system according to claim 23, wherein the robot arm is a collaborative robot arm.

25. The robotic refuelling system according to claim 23, wherein the robotic refuelling system further comprises a suction cup configured to follow a predefined coordinate.

26. The robotic refuelling system according to claim 25, wherein the predefined coordinate is defined by means of a two-point teach-in.

27. The robotic refuelling system according to claim 25, wherein the suction cup is configured to follow a predefined path, wherein the predefined path is defined by a straight line between two-points.

28. The robotic refuelling system according to claim 23, wherein the system is further configured such that the adaptor tool engages with the fuel dispenser, prepares the fuel door for a fuel intake, provides the fuel dispenser to a fuel-receiving part of the vehicle, and provides the fuel.

29. The robotic refuelling system according to claim 23, wherein the adaptor further comprises an inductive sensor configured for activating a free-drive function such that the adaptor tool can be controlled manually.

30. The robotic refuelling system according to claim 23, wherein the robotic fueling system comprises a button unit, wherein the button unit in an activated state is configured for activating a free-drive function.

31. The robotic refuelling system according to claim 30, wherein the button unit comprises a sensor for sensing when the button unit is at the activated position.

32. The robotic refuelling system according to claim 30, wherein the button unit is airtight.

* * * * *